United States Patent
Chen et al.

(10) Patent No.: US 11,503,205 B2
(45) Date of Patent: Nov. 15, 2022

(54) PHOTOGRAPHING METHOD AND DEVICE, AND RELATED ELECTRONIC APPARATUS

(71) Applicant: GUANGDONG OPPO MOBILE TELECOMMUNICATIONS CORP., LTD., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 257 days.

(21) Appl. No.: 16/764,690

(22) PCT Filed: Dec. 18, 2018

(86) PCT No.: PCT/CN2018/121753
§ 371 (c)(1),
(2) Date: May 15, 2020

(87) PCT Pub. No.: WO2019/134502
PCT Pub. Date: Jul. 11, 2019

(65) Prior Publication Data
US 2020/0412942 A1    Dec. 31, 2020

(30) Foreign Application Priority Data
Jan. 5, 2018 (CN) .......................... 201810012466.1

(51) Int. Cl.
*H04N 5/232* (2006.01)
*G06K 9/62* (2022.01)
*G06V 20/00* (2022.01)

(52) U.S. Cl.
CPC ....... *H04N 5/23222* (2013.01); *G06K 9/6256* (2013.01); *G06V 20/35* (2022.01)

(58) Field of Classification Search
CPC .......... H04N 5/23222; H04N 5/23218; H04N 5/23229; H04N 5/23245; H04N 5/232935;
(Continued)

(56) References Cited

U.S. PATENT DOCUMENTS 8,665,343 B2 * 3/2014 Saito .................. H04N 5/23222
348/333.12
9,171,352 B1 * 10/2015 Raynaud .............. G06V 10/993
(Continued)

FOREIGN PATENT DOCUMENTS

| CN | 1937813 A | 3/2007 |
| CN | 103763475 A | 4/2014 |

(Continued)

OTHER PUBLICATIONS

Chinese Second Office Action with English Translation for CN Application 201810012466.1 dated Apr. 26, 2020. (16 pages).
(Continued)

*Primary Examiner* — Michael S Osinski
(74) *Attorney, Agent, or Firm* — Young Basile Hanlon & MacFarlane, P.C.

(57) ABSTRACT

A photographing method and device, a storage medium and an electronic apparatus are disclosed. The method includes the following. A current photographing scene is determined based on a current preview image. Based on the current photographing scene, pre-stored historical adjustment information of a photographing parameter matching the current photographing scene is acquired. Current adjustment information is determined based on the historical adjustment information. Adjustment is performed on the current preview image on the basis of the current adjustment information, and an adjusted current preview image is output.

18 Claims, 4 Drawing Sheets

(58) Field of Classification Search
CPC ...... H04N 5/76; H04N 5/23293; H04N 5/232; G06K 9/6256; G06K 9/6271; G06V 20/35; G06V 10/147; G06V 10/82; G06V 20/30; G06N 3/0454; G06N 3/08
See application file for complete search history.

(56) References Cited

U.S. PATENT DOCUMENTS

| | | | |
|---|---|---|---|
| 9,338,311 B2* | 5/2016 | Kobayashi | H04N 5/23222 |
| 9,432,583 B2* | 8/2016 | Niemi | H04N 5/2356 |
| 9,456,148 B1 | 9/2016 | Khem et al. | |
| 9,615,015 B2* | 4/2017 | Hunter | H04N 5/23299 |
| 9,807,301 B1* | 10/2017 | Weisberg | H04N 5/2356 |
| 9,900,519 B2* | 2/2018 | Fan | H04N 5/23212 |
| 10,026,201 B2* | 7/2018 | Peng | G06K 9/6267 |
| 10,326,925 B2* | 6/2019 | Kawanishi | H04N 5/232122 |
| 10,389,950 B2* | 8/2019 | Kosaka | H04N 5/2353 |
| 11,095,804 B2* | 8/2021 | Cao | H04N 5/23222 |
| 2008/0118238 A1* | 5/2008 | Sogawa | G02B 7/285 396/128 |
| 2010/0026836 A1* | 2/2010 | Sugimoto | H04N 5/23219 348/333.12 |
| 2011/0025709 A1 | 2/2011 | Ptucha et al. | |
| 2011/0129151 A1 | 6/2011 | Saito et al. | |
| 2012/0098989 A1* | 4/2012 | Sugawara | G11B 27/34 348/222.1 |
| 2012/0140985 A1* | 6/2012 | Hattori | H04N 9/7904 382/103 |
| 2012/0182447 A1* | 7/2012 | Gabay | H04N 5/23222 348/222.1 |
| 2012/0201426 A1 | 8/2012 | Jasinski | |
| 2013/0194427 A1* | 8/2013 | Hunter | H04N 5/23206 348/157 |
| 2013/0202209 A1 | 8/2013 | Ariyama | |
| 2016/0286114 A1 | 9/2016 | Fan | |
| 2017/0006226 A1* | 1/2017 | Chino | H04N 5/2256 |
| 2018/0007260 A1* | 1/2018 | Fukui | H04N 5/23216 |
| 2018/0124300 A1* | 5/2018 | Brook | H04N 5/232133 |
| 2018/0150725 A1* | 5/2018 | Tate | H04N 5/2353 |
| 2018/0150977 A1* | 5/2018 | Peng | G06K 9/6232 |
| 2018/0167545 A1* | 6/2018 | Kosaka | G03B 15/00 |
| 2018/0198988 A1* | 7/2018 | Suo | H04N 1/00 |
| 2018/0220061 A1* | 8/2018 | Wang | H04N 5/2356 |
| 2018/0350106 A1* | 12/2018 | Kasilya Sudarsan | H04N 5/232939 |
| 2020/0068141 A1* | 2/2020 | Katsumata | G06T 7/20 |
| 2020/0097767 A1* | 3/2020 | Perry | G06K 9/6263 |
| 2020/0134375 A1* | 4/2020 | Zhan | G06N 3/084 |
| 2020/0137300 A1* | 4/2020 | Ogawa | G06V 10/50 |
| 2020/0228692 A1* | 7/2020 | Wakamatsu | H04N 5/232 |
| 2021/0133474 A1* | 5/2021 | Sawada | G06V 10/82 |

FOREIGN PATENT DOCUMENTS

| | | |
|---|---|---|
| CN | 105915790 A | 8/2016 |
| CN | 106060668 A | 10/2016 |
| CN | 106210513 A | 12/2016 |
| CN | 106357983 A | 1/2017 |
| CN | 106412438 A | 2/2017 |
| CN | 107194318 A | 9/2017 |
| CN | 107295391 A | 10/2017 |
| CN | 107395956 A | 11/2017 |
| CN | 107454331 A | 12/2017 |
| EP | 2123025 A2 | 11/2009 |
| EP | 2945102 A1 | 11/2015 |
| JP | 5531646 B2 | 6/2014 |
| WO | 2017047012 A1 | 3/2017 |

OTHER PUBLICATIONS

English translation of OA for CN application 201810012466.1 dated Nov. 27, 2019.
English translation of ISR for PCT application PCT/CN2018/121753 dated Feb. 27, 2019.
Search Report for EP application 18898217.7 dated Dec. 9, 2020.
Indian Office Action for IN Application 202017024441 dated Jun. 16, 2021. (6 pages).
Communication pursuant to Article 94(3) EPC for EP Application 18898217.7 dated Jul. 22, 2021. (6 pages).

* cited by examiner

PHOTOGRAPHING METHOD AND DEVICE, AND RELATED ELECTRONIC APPARATUS

CROSS-REFERENCE TO RELATED APPLICATION(S)

The present application is a 371 application of International Patent Application No. PCT/CN2018/121753, filed on Dec. 18, 2018, which claims priority to Chinese Patent Application No. 201810012466.1, filed Jan. 5, 2018, the disclosures of both of which are incorporated herein by reference in their entireties.

TECHNICAL FIELD

The present disclosure relates to a field of electronic technologies, and more particularly, to a photographing method and apparatus, a storage medium and an electronic device.

BACKGROUND

With continuous development of technologies, mobile terminals such as smart phones and tablet computers have more and more functions. In daily life, the mobile terminals are no longer functioned as communication tools, but have become a necessity for people's work, leisure and entertainment. Taking pictures with mobile phones is also becoming a part of people's daily life.

SUMMARY

Embodiments of the present disclosure provide a photographing method. The photographing method includes:
determining a current photographing scene based on a current preview image;
acquiring, based on the current photographing scene, pre-stored historical adjustment information of a photographing parameter matching the current photographing scene;
determining current adjustment information of the photographing parameter based on the historical adjustment information; and
adjusting the current preview image based on the current adjustment information of the photographing parameter, and outputting an adjusted current preview image.

Embodiments of the present disclosure further provide a non-transitory computer readable storage medium. The non-transitory computer readable storage medium has instructions stored thereon, and the instructions are suitable for being loaded by a processor to perform acts of:
determining a current photographing scene based on a current preview image;
acquiring, based on the current photographing scene, pre-stored historical adjustment information of a photographing parameter matching the current photographing scene;
determining current adjustment information of the photographing parameter based on the historical adjustment information; and
adjusting the current preview image based on the current adjustment information of the photographing parameter, and outputting an adjusted current preview image.

Embodiments of the present disclosure further provide an electronic device. The electronic device includes a memory and a processor. The memory is configured to store instructions and data, and the instructions are suitable for being loaded by the processor to perform acts of:
determining a current photographing scene based on a current preview image;
acquiring, based on the current photographing scene, pre-stored historical adjustment information of a photographing parameter matching the current photographing scene;
determining current adjustment information of the photographing parameter based on the historical adjustment information; and
adjusting the current preview image based on the current adjustment information of the photographing parameter and outputting an adjusted current preview image.

BRIEF DESCRIPTION OF DRAWINGS

The detailed description of the present disclosure will be described in detail with reference to accompanying drawings, to make the technical solution of the present disclosure and its beneficial effects apparent.

DETAILED DESCRIPTION

Figure 1:
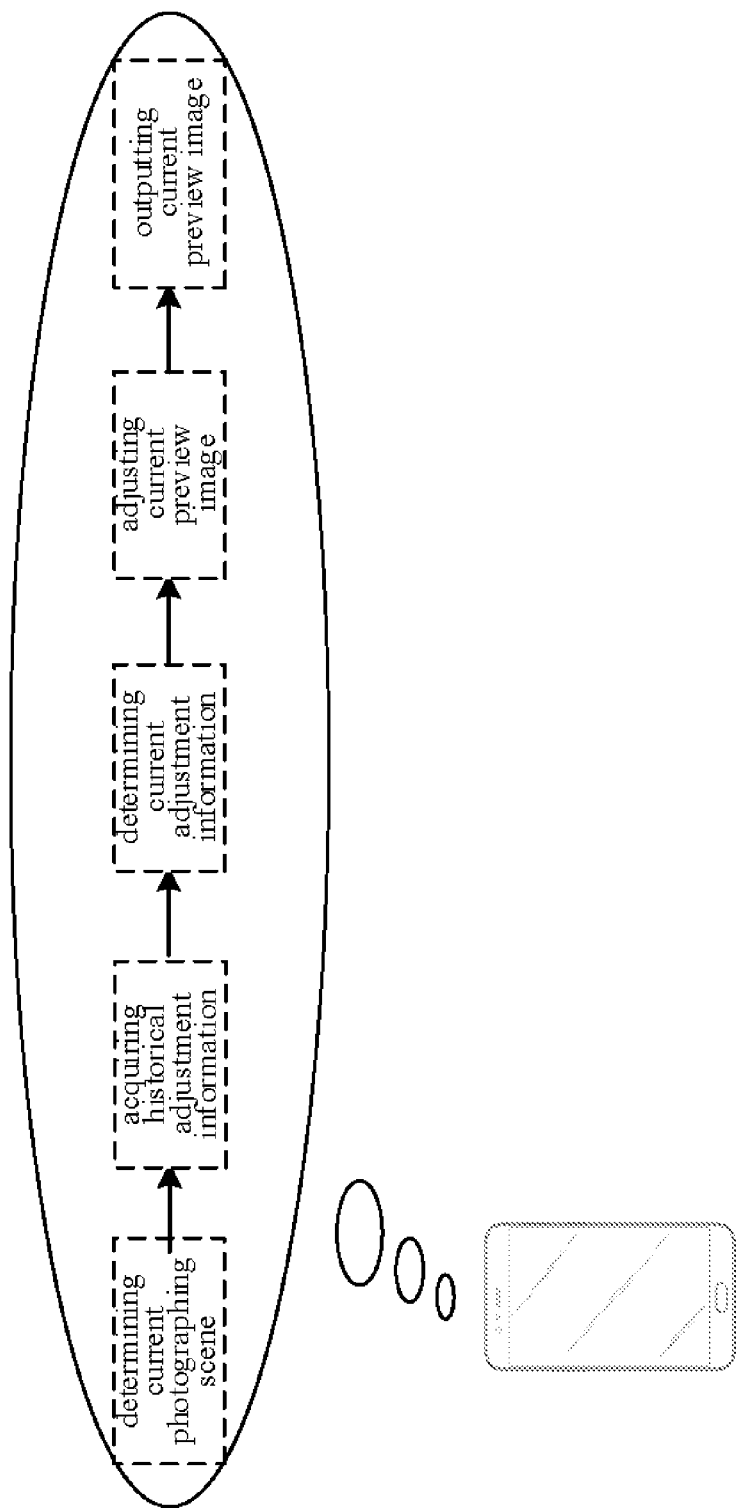
FIG. 1 is a schematic diagram illustrating a scene of a photographing method according to embodiments of the present disclosure.

The same reference numeral in the accompanying drawings represents the same component. The principle of the present disclosure is illustrated by implementing the present disclosure in an appropriate computing environment. The following description is based on example embodiments of the present disclosure, and should not be construed as limiting other embodiments of the present disclosure that are not described in detail herein.

Embodiments of the present disclosure provide a photographing method and apparatus, a storage medium, and an electronic device.

The photographing apparatus may be integrated in an electronic device, such as a mobile phone, a tablet computer, and an unmanned aerial vehicle having a photographing function.

For example, as illustrated in FIG. 1, the photographing apparatus may be configured to determine a current photographing scene based on a current preview image. The photographing scene may be a beach scene, a food scene, a night scene, a flower scene, an animal scene, and the like. Pre-stored historical adjustment information of a photographing parameter matching the current photographing scene is acquired based on the current photographing scene, such that current adjustment information of the photographing parameter is determined based on the historical adjustment information, the current preview image is adjusted based on the current adjustment information of the photographing parameter and an adjusted current preview image is outputted. In this way, the present disclosure may automatically adjust the photographing parameter depending on different photographing scenes without manual adjustment by the user, thereby being convenient for the user. In addition, through determining the current adjustment information of the photographing parameter using the historical adjustment information of the photographing parameter generated by the user in different scenes, the photographing parameter is adjusted in combination with photographing habits of the user, such that effect of the preview image may be consistent with preferences of the user, and frequency of manually adjusting the photographing parameter by the user may be reduced, thereby allowing the imaging smart.

Detailed description will be given below.

Embodiments of the present disclosure provide a photographing method. The method includes: determining a current photographing scene based on a current preview image; acquiring, based on the current photographing scene, pre-stored historical adjustment information of a photographing parameter matching the current photographing scene; determining current adjustment information of the photographing parameter based on the historical adjustment information; and adjusting the current preview image based on the current adjustment information of the photographing parameter and outputting an adjusted current preview image.

In some embodiments, determining the current adjustment information of the photographing parameter based on the historical adjustment information includes: in case that two or more pieces of historical adjustment information of the photographing parameter exist, setting a weight for each piece of historical adjustment information based on a preset rule; and performing a calculation on all pieces of historical adjustment information of the photographing parameter based on the weight for each piece of historical adjustment information to obtain the current adjustment information of the photographing parameter.

In some embodiments, before setting the weight for each historical adjustment information based on the preset rule, the method further includes: judging whether the number of the pieces of historical adjustment information is greater than or equal to a predetermined number; and in response to judging that the number of the pieces of the historical adjustment information is greater than or equal to the predetermined number, selecting a predetermined number of pieces of historical adjustment information. Setting the weight for each piece of historical adjustment information based on the preset rule includes: setting the weight for each selected piece of historical adjustment information based on the preset rule. Performing the calculation on all pieces of historical adjustment information of the photographing parameter based on the weight for each piece of historical adjustment information includes: performing the calculation on the predetermined number of piece of historical adjustment information selected based on the weight for each selected piece of historical adjustment information to obtain the current adjustment information of the photographing parameter.

In some embodiments, performing the calculation on the predetermined number of the pieces of historical adjustment information selected based on the weight for each selected piece of historical adjustment information includes: performing the calculation on the predetermined number of pieces of historical adjustment information selected based on a following formula: $P=\lambda 1*P1+\lambda 2*P2+ \ldots +\lambda n*Pn$, where, $\lambda 1+\lambda 2+ \ldots +\lambda n=1$, n is the predetermined number, P is the current adjustment information, $P1, P2, \ldots, Pn$ represent n selected pieces of historical adjustment information respectively, and $\lambda 1, \lambda 2, \ldots, \lambda n$ represent the weights for the n pieces of historical adjustment information, respectively.

In some embodiments, setting the weight for each selected piece of historical adjustment information based on the preset rule includes: setting the weight for each selected piece of historical adjustment information selected based on a sequence of storing time of the historical adjustment information, such that the closer the storing time to a current time point, the greater the weight of the historical adjustment information associated with the storing time.

In some embodiments, selecting the predetermined number of pieces of historical adjustment information includes: starting from the historical adjustment information having a storing time closest to the current time point, sequentially selecting the predetermined number of pieces of historical adjustment information in an order of the storing time from closest to farthest to the current time point.

In some embodiments, determining the current adjustment information of the photographing parameter based on the historical adjustment information includes: in case that one piece of historical adjustment information of the photographing parameter exists, determining the historical adjustment information as the current adjustment information of the photographing parameter.

In some embodiments, determining the current photographing scene based on the current preview image includes: acquiring a picture corresponding to the current preview image; and recognizing the picture with a convolutional neural network picture recognition model to determine the current photographing scene.

In some embodiments, before acquiring, based on the current photographing scene, the pre-stored historical adjustment information of the photographing parameter matching the current photographing scene, the method further includes: collecting multiple historical preview images; recognizing the multiple historical preview images with the convolutional neural network picture recognition model to determine multiple historical photographing scenes; acquiring the historical adjustment information of the photographing parameter for capturing each historical preview image to acquire the historical adjustment information of the photographing parameter in each historical photographing scene corresponding to the respective historical preview image; and storing the multiple historical photographing scenes and each historical adjustment information of the photographing parameter in respective historical photographing scene to establish a correspondence between each historical photographing scene and the historical adjustment information of the photographing parameter in each historical photographing scene.

Acquiring, based on the current photographing scene, the pre-stored historical adjustment information of the photographing parameter matching the current photographing scene includes: acquiring, based on the correspondence, the historical adjustment information of the photographing parameter matching the current photographing scene.

Figure 2:
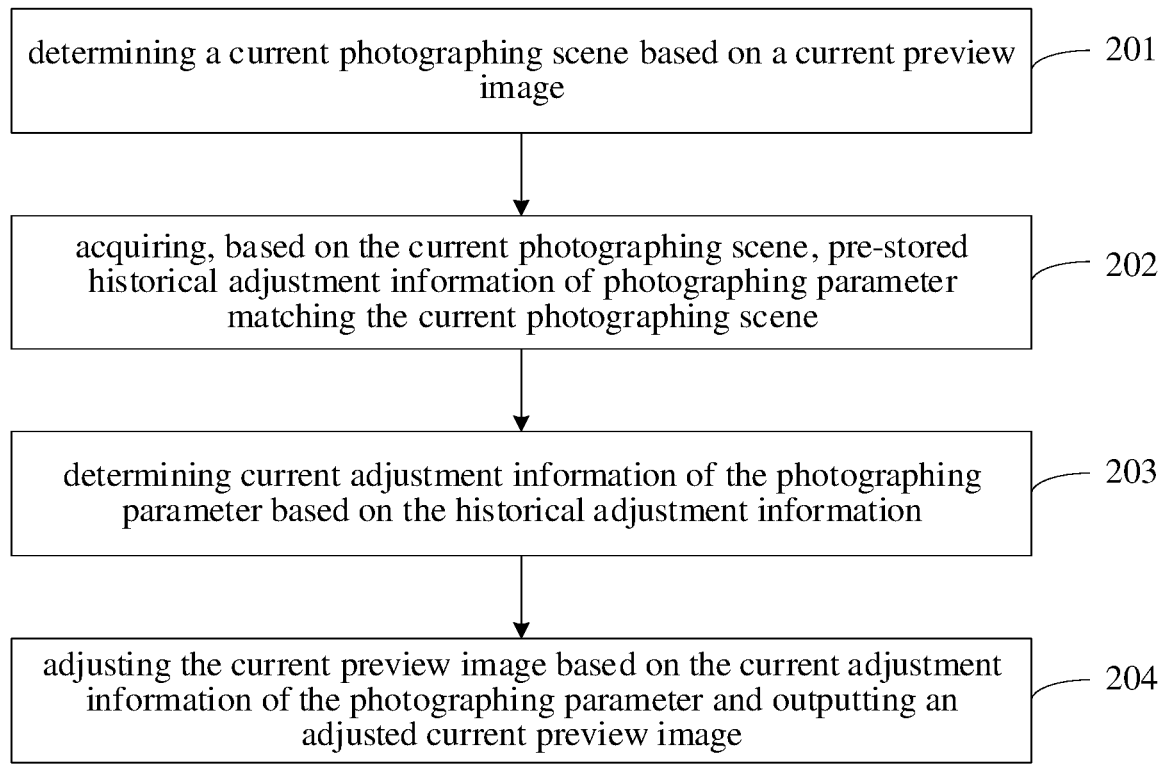
FIG. 2 is a flowchart illustrating a photographing method according to embodiments of the present disclosure.

As illustrated in FIG. 2, the photographing method according to embodiments of the present disclosure may include the following.

At block 201, a current photographing scene is determined based on a current preview image.

When a camera of an electronic device is turned on, an image may be captured in real time. The current preview image is an image currently captured by the camera. The preview image may be displayed on a display screen, so that the user may view the content currently photographed and photographing effect through the preview image.

The photographing scene may include, for example a beach scene, a food scene, a night scene, a flower scene, an animal scene, and so on. The current preview image may be recognized by an image recognition algorithm to determine the current photographing scene. For example, when it is recognized that a flower exists in the current preview image, the current photographing scene may be determined as the flower scene.

In some embodiments, determining the current photographing scene based on the current preview image may include acquiring a picture corresponding to the current preview image; and recognizing the picture with a convolutional neural network picture recognition model to determine the current photographing scene. For example, the convolutional neural network picture recognition model may be a picture recognition model based on the convolutional neural network. The convolutional neural network includes an input lay, a hidden layer and an output layer. The hidden layer includes a convolution layer, a pooling layer and full-connected layer. After the picture is inputted to the picture recognition model based on the convolutional neural network, the convolution layer is configured to extract features of the picture initially. The pooling layer is configured to extract key features. The full-connected layer is configured to combine the features extracted to generate the output, i.e., the current photographing scene. For example, the current photographing scene may be recognized by obtaining the current preview image, scaling the current preview image down to a picture having 122*122 pixels and inputting the scaled-down picture to a trained convolutional neural network picture recognition model. Before using the convolutional neural network picture recognition model to recognize the current preview image, the convolutional neural network picture recognition model may be trained. For example, multiple historically photographed images may be collected as training samples to train the convolutional neural network picture recognition model, so as to determine parameters of the convolutional neural network picture recognition model and to obtain a trained convolutional neural network picture recognition model. Therefore, the convolutional neural network picture recognition model may be configured to recognize the photographing scene corresponding to the current preview image.

At block 202, pre-stored historical adjustment information of a photographing parameter matching the current photographing scene is acquired based on the current photographing scene.

The photographing parameter may be any kind of photographing parameters, such as brightness, contrast, exposure, or white balance. The adjustment information of the photographing parameter refers to a specific value of the photographing parameter. For instance, taking the brightness as an example, the adjustment information of the brightness may refer to a brightness value.

In embodiments, the historical adjustment information of the photographing parameter in different photographing scenes may be stored in advance. For example, the adjustment information of each photographing parameter set by the user in different photographing scenes before the current time point, for example within a period of time before the current time point, may be stored, such that the historical adjustment information of each photographing parameter in various photographing scene is stored in advance.

In some embodiments, before acquiring the pre-stored historical adjustment information of the photographing parameter matching the current photographing scene, the method further includes storing the historical adjustment information as follows.

First, multiple historical preview images are collected.

The historical preview image is, for example, a preview image captured by the camera each time the camera is turned on by the user within a period of time before the current time point, for example, within a month or a week.

Second, the multiple historical preview images are recognized with the convolutional neural network picture recognition model to determine multiple historical photographing scenes.

A picture corresponding to the historical preview image is input into the trained convolutional neural network picture recognition model, to identify a photographing scene corresponding to the historical preview image.

Third, the historical adjustment information of the photographing parameter for photographing each historical preview image is acquired, to acquire the historical adjustment information of the photographing parameter in the historical photographing scene corresponding to the historical preview image.

Each time a historical preview image is obtained, scene recognition may be performed on the historical preview image to recognize the historical photographing scene corresponding to the historical preview image, and the historical adjustment information of the photographing parameter for photographing the historical preview image may be acquired. That is, the value of the photographing parameter set by the user when the historical preview image is captured can be acquired, to obtain the historical adjustment information of the photographing parameter in the photographing scene corresponding to the historical preview image. For example, when the historical preview image is acquired and recognized using the convolutional neural network picture recognition model, the historical photographing scene corresponding to the historical preview image obtained may be a beach scene. The historical adjustment information of each photographing parameter when photographing the historical preview image may be recorded, to obtain, for example, the brightness, the contrast, and the exposure, to acquire a value of the brightness, a value of the contrast, and a value of the exposure in the beach scene. In case that two historical preview images acquired are recognized as the beach scene, the historical adjustment information of each photographing parameter when the two preview images are captured may be obtained respectively for the two historical preview images, so that two values of the brightness, two values of the contrast and two values of the exposure in the beach scene may be obtained.

Fourth, the multiple historical photographing scenes and the historical adjustment information of the photographing parameter in each historical photographing scene are saved to establish a correspondence between each historical photographing scene and the historical adjustment information of the photographing parameter in each historical photographing scene.

Taking a case that the photographing parameter includes the brightness, the contrast, and the exposure as an example, each historical photographing scene and the historical adjustment information of the photographing parameter corresponding to each historical photographing scene may be stored as a table format, for example, which is shown in a following table.

TABLE 1

A table for storing photographing scene
and historical adjustment information

| photograph-ing scene | photographing parameter | May 3 | May 5 | May 10 | May 12 | May 13 | May 20 |
|---|---|---|---|---|---|---|---|
| beach scene | brightness | a10 | a11 | a12 | a13 | a14 | a15 |
|  | contrast | b10 | b11 | b12 | b13 | b14 | b15 |
|  | exposure | c10 | c11 | c12 | c13 | c14 | c15 |
| food scene | brightness | a20 | a21 | a22 | a23 | a24 | a25 |
|  | contrast | b20 | b21 | b22 | b23 | b24 | b25 |
|  | exposure | c20 | c21 | c22 | c23 | c24 | c25 |
| flower scene | brightness | a30 | a31 | a32 | a33 | a34 | a35 |
|  | contrast | b30 | b31 | b32 | b33 | b34 | b35 |
|  | exposure | c30 | c31 | c32 | c33 | c34 | c35 |

In table 1, a10~a14, b10~b14, c10~c14, etc., represent the adjustment information of the photographing parameters, i.e., values of the brightness, values of the exposure, and values of the contrast. In table 1, May 3, May 5, May 10, etc., indicate dates of storing the adjustment information. As shown in the table, in embodiments, each time when the historical photographing scene of the historical preview image is recognized, the adjustment information of each photographing parameter set by the user for the historical preview image and the photographing scene corresponding to the historical preview image are stored. Each group of the adjustment information of photographing parameters may be stored in an order of date for capturing the historical preview images. For example, a10, b10, and c10 are a group of adjustment information of photographing parameters. Further, the correspondence between the historical photographing scenes and the adjustment information of the photographing parameters corresponding to the respective historical photographing scenes may be established.

In the block 202, the historical adjustment information of the photographing parameter matching the current photographing scene may be acquired based on the correspondence. For example, after the current photographing scene is recognized, the current photographing scene may be compared with the pre-stored historical photographing scenes to find a historical photographing scene that is consistent with the current photographing scene. Further, the stored historical adjustment information of the photographing parameter corresponding to the historical photographing scene that is consistent with the current photographing scene may be acquired. Consequently, the historical adjustment information of the photographing parameter matching the current photographing scene may be obtained. For example, in case that the current photographing scene is the flower scene and the photographing parameter includes the brightness, the contrast and the exposure, the pre-stored historical adjustment information of the photographing parameter corresponding to the flower scene may be: (a30, b30, c30), (a31, b31, c31), . . . , (a34, b34, c34), such that the historical adjustment information of the photographing parameter matching the current photographing scene is obtained.

At block 203, the current adjustment information of the photographing parameter is determined based on the historical adjustment information.

In embodiments of the present disclosure, various methods may be adopted to determine the current adjustment information of the photographing parameter. For example, for each photographing parameter, an average value of the historical adjustment information of the photographing parameter may be obtained as the current adjustment information. As another example, one of the historical adjustment information may be selected as the current adjustment information. As still another example, the current adjustment information may be obtained through a calculation by setting weights for the historical adjustment information. The method for determining the current adjustment information may be determined according to actual needs.

In embodiments, determining the current adjustment information of the photographing parameter based on the historical adjustment information may include the following.

First, in case that two or more pieces of historical adjustment information of the photographing parameter exist, a respective weight may be set for each piece of historical adjustment information based on a preset rule.

Second, a calculation is performed on all pieces of historical adjustment information of the photographing parameter based on the respective weight of each historical adjustment information to obtain the current adjustment information of the photographing parameter.

For example, when the photographing parameter is the brightness, according to the above (1) and (2), the weight may be set for each piece of historical adjustment information of the brightness according to the preset rule when there are multiple pieces of historical adjustment information of the brightness. The calculation is performed on all pieces of historical adjustment information of brightness based on the weight of each piece of historical adjustment information to obtain the current adjustment information of brightness.

When there is a large amount of pieces of historical adjustment information of the photographing parameter, in order to reduce calculation time and improve efficiency, some of the pieces of historical adjustment information may be selected for the calculation to obtain the current adjustment information. For example, before setting the weight for each piece of historical adjustment information of the photographing parameter, the method may further include: judging whether the number of the pieces of historical adjustment information is greater than or equal to a predetermined number; and in response to determining that the number is greater than or equal to the predetermined number, selecting the predetermined number of pieces of historical adjustment information.

When the number of the pieces of historical adjustment information is less than the predetermined number, no selection operation is performed. Instead, the weights are set for all pieces of historical adjustment information, and the calculation is performed on all pieces of historical adjustment information based on the weights to obtain the current adjustment information of the photographing parameter.

In embodiments, when the number of the pieces of historical adjustment information is greater than or equal to the predetermined number, the predetermined number of the pieces of historical adjustment information may be selected sequentially in an order of storing time of the historical adjustment information. In detail, starting from the historical adjustment information having a storing time closest to the current time point, the predetermined number of pieces of historical adjustment information may be sequentially selected in an order of storing time from closest to farthest to the current time point. The predetermined number may be set according to actual needs, for example, 5, 8, or 15 and so on. Take a case that the photographing parameter is the brightness and the predetermined number is 5 as an example, when the current time point is 10 o'clock on June 1, as shown in Table 1, regarding to the photographing parameter of the brightness, the first five historical brightness values, a15, a14, a13, a12 and a11, closed to the current time point are selected to calculate the current brightness value of brightness. Certainly, in other embodiments, the predetermined number of pieces of historical adjustment information may be selected in an order of storing time from farthest to closest to the current time point, or the predetermined number of pieces of historical adjustment information may be selected at intervals in an order of storing time from farthest to closest to the current time point, which is not limited herein.

After selecting the predetermined number of pieces of historical adjustment information, setting the weight for each piece of historical adjustment information according to the preset rule may include: setting the weight for each selected piece of historical adjustment information based on the preset rule, and performing the calculation on the predetermined number of pieces of historical adjustment information selected, based on the weight for each selected piece of historical adjustment information, to obtain the current adjustment information of the photographing parameter. The preset rule may be, for example, setting the weights based on the sequence of the storing time of the historical adjustment information, such that the closer the storing time to the current time point, the greater the weight of the corresponding historical adjustment information, or the closer the storing time to the current time point, the smaller the weight of the corresponding historical adjustment information. In other embodiments, the weight of the historical adjustment information corresponding to the storing time ranked at the middle may be set as a maximum value, while weights of other historical adjustment information corresponding to the storing time ranked at the top and at the bottom may be set as smaller values. The rule may be determined based on actual needs, and is not limited here. The sum of all weights is 1.

For example, the photographing parameter is the brightness. The preset rule may be, for example, setting the weights based on the sequence of the storing time of historical brightness values. The closer the storing time to the current time point, the greater the weight of the historical brightness value. In case that five selected historical brightness values are a15, a14, a13, a12, a11, the weights for the five selected historical brightness values decreases gradually, since the preset rule is that the closer the storing time of the historical brightness value to the current time point, the greater the weight for the historical brightness value. The values of the weights for the five historical brightness values may be set according to actual needs. For example, the weight of the historical brightness value corresponding to the storing time closest to the current time point (i.e. a15) may be set to 0.6, and weights for a14, a13, a12, and a11 may be set to 0.2, 0.1, 0.08, and 0.02, respectively. As another example, the preset rule may be that the historical brightness value corresponding to the storing time ranked at the middle has the maximum weight and other brightness values have smaller weights. In this case, the storing time of a13 is ranked at the middle, such that the weight for a13 may be maximum, for example, 0.5, while the weights for a15, a14, a12 and a11 may be set to 0.1, 0.15, 0.15, and 0.1, respectively. The weight may indicate a preference degree of the user to the adjustment information of the photographing parameter.

In embodiments, performing the calculation on the predetermined number of pieces of historical adjustment information selected based on the weight for each selected piece of historical adjustment information may include: performing the calculation on the predetermined number of pieces of historical adjustment information selected based on a following formula: $P=\lambda 1*P1+\lambda 2*P2+ \ldots +\lambda n*Pn$, where, $\lambda 1+\lambda 2+ \ldots +\lambda n=1$, n is the predetermined number, P is the current adjustment information, P1, P2, ..., Pn represent n selected pieces of historical adjustment information respectively, and $\lambda 1, \lambda 2, \ldots, \lambda n$ represent the weights for the n pieces of historical adjustment information, respectively. Consequently, the current adjustment information of the photographing parameter may be calculated.

At block 204, the current preview image is adjusted based on the current adjustment information of the photographing parameter to output an adjusted current preview image.

After the current adjustment information of the photographing parameter is obtained, the current adjustment information may be used to adjust the current preview image to output the adjusted current preview image, such that the user may perform the photographing based on the current preview image.

With the embodiments, the photographing parameter may be automatically adjusted depending on various photographing scenes without manual adjustment of the user, thereby providing convenience for the user. In addition, by determining the current adjustment information of the photographing parameter using the historical adjustment information of the photographing parameter set by the user in different scenes, the photographing parameter may be adjusted in combination with photographing habits of the user, such that the effect of the preview image may be satisfied by the user. Furthermore, the frequency of manually adjusting by the user the photographing parameter may be reduced, to enable smart photographing.

In the above blocks 201 to 204, the photographing parameter may be any kind of photographing parameters of the camera, such as the brightness, the contrast, or the exposure. Various photographing parameters used for photographing an image may be determined based on blocks 201 to 204. For example, in the Table 1, the historical adjustment information of three photographing parameters may be stored for each photographing scene. Therefore, in the current photographing scene, the current adjustment information of the three photographing parameters may be determined according to blocks 201 to 204, respectively.

In some embodiments, there may be only one piece of historical adjustment information of the photographing parameter. For example, in the Table 1, only one historical brightness value of the brightness is included, the historical brightness value may be used as the current brightness value. Certainly, in other embodiments, when there is only one piece of historical adjustment information of the photographing parameter, default adjustment information of the camera may also be used as the adjustment information of the photographing parameter.

In some embodiments, after the adjusted current preview image is output, if the user takes a picture based on the adjusted current preview image (that is, a photographing instruction of the user is detected), the current photographing scene and the current adjustment information of the photographing parameter when capturing the current preview image may be stored, and the storing time may be recorded. Therefore, a correspondence between the photographing scene and the current adjustment information of the photographing parameter is established. The correspondence may provide the historical adjustment information to adjust the photographing parameter when the user takes a picture next time.

For the storage table used to store the photographing scenes and the historical adjustment information in the present disclosure, in order to save the cost of maintaining and updating the storage table, only the predetermined number of newly generated historical adjustment information may be recorded in the storage table. For a photographing scene, if a new piece of historical adjustment information is generated, the new piece of historical adjustment information is updated to the storage table, and an oldest piece of historical adjustment information is removed from the storage table.

Embodiments of the present disclosure provide a photographing apparatus. The photographing apparatus includes a first determination module, a first acquisition module, a second determination module and an output module.

The first determination module is configured to determine a current photographing scene based on a current preview image.

The first acquisition module is configured to acquire, based on the current photographing scene, pre-stored historical adjustment information of the photographing parameter matching the current photographing scene.

The second determination module is configured to determine current adjustment information of the photographing parameter based on the historical adjustment information.

The output module is configured to adjust the current preview image based on the current adjustment information of the photographing parameter to output an adjusted current preview image.

In some embodiments, the second determination module is further configured to: in case that two or more pieces of historical adjustment information of the photographing parameter exist, set a weight for each piece of historical adjustment information based on the preset rule; and perform a calculation on all pieces of historical adjustment information of the photographing parameter based on the weight for each piece of historical adjustment information to obtain the current adjustment information of the photographing parameter.

In some embodiments, the photographing apparatus further includes a judging module and a selection module.

The judging module is configured to judge whether a number of the pieces of historical adjustment information is greater than or equal to a predetermined number.

The selection module is configured to, in response to judging that the number of the pieces of historical adjustment information is greater than or equal to the predetermined number, select the predetermined number of pieces of historical adjustment information.

The second determination module is configured to: set the weight for each selected piece of historical adjustment information based on the preset rule; and performing the calculation on the predetermined number of pieces of historical adjustment information selected based on the weight for each selected piece of historical adjustment information to obtain the current adjustment information of the photographing parameter.

In some embodiments, the second determination module is configured to: perform the calculation on the predetermined number of pieces of historical adjustment information selected based on a following formula: $P=\lambda 1*P1+\lambda 2*P2+ \ldots +\lambda n*Pn$, where, $\lambda 1+\lambda 2+ \ldots +\lambda n=1$, n is the predetermined number, P is the current adjustment information, P1, P2, . . . , Pn represent n selected pieces of historical adjustment information respectively, and $\lambda 1, \lambda 2, \ldots , \lambda n$ represent the weights for the n pieces of historical adjustment information, respectively.

In some embodiments, the second determination module is configured to set the weight for each selected piece of historical adjustment information based on an order of storing time of the historical adjustment information such that the closer the storing time to a current time point, the greater the weight of the historical adjustment information corresponding to the storing time.

In some embodiments, the selection module is configured to, starting from the historical adjustment information having a storing time closest to the current time point, sequentially select the predetermined number of pieces of historical adjustment information in an order of storing time from closest to farthest to the current time point.

In some embodiments, the second determination module is configured to, in case that one piece of historical adjustment information of the photographing parameter exists, determine the piece of historical adjustment information as the current adjustment information of the photographing parameter.

In some embodiments, the first determination module is configured to: acquire a picture corresponding to the current preview image; and recognize the picture with a convolutional neural network picture recognition model to determine the current photographing scene.

In some embodiments, the photographing apparatus further includes a collection module, a third determination module, a second acquisition module and a storage module.

The collection module is configured to collect multiple historical preview images.

The third determination module is configured to recognize the multiple historical preview images with the convolutional neural network picture recognition model to determine multiple historical photographing scenes.

The second acquisition module is configured to acquire the historical adjustment information of the photographing parameter for photographing each historical preview image to acquire the historical adjustment information of the photographing parameter in a historical photographing scene corresponding to the historical preview image.

The storage module is configured to save the multiple historical photographing scenes and the historical adjustment information of the photographing parameter in each historical photographing scene to establish a correspondence between each historical photographing scene and the historical adjustment information of the photographing parameter in each historical photographing scene.

The first acquisition module is configured to acquire, based on the correspondence, the historical adjustment information of the photographing parameter matching the current photographing scene.

Figure 3:
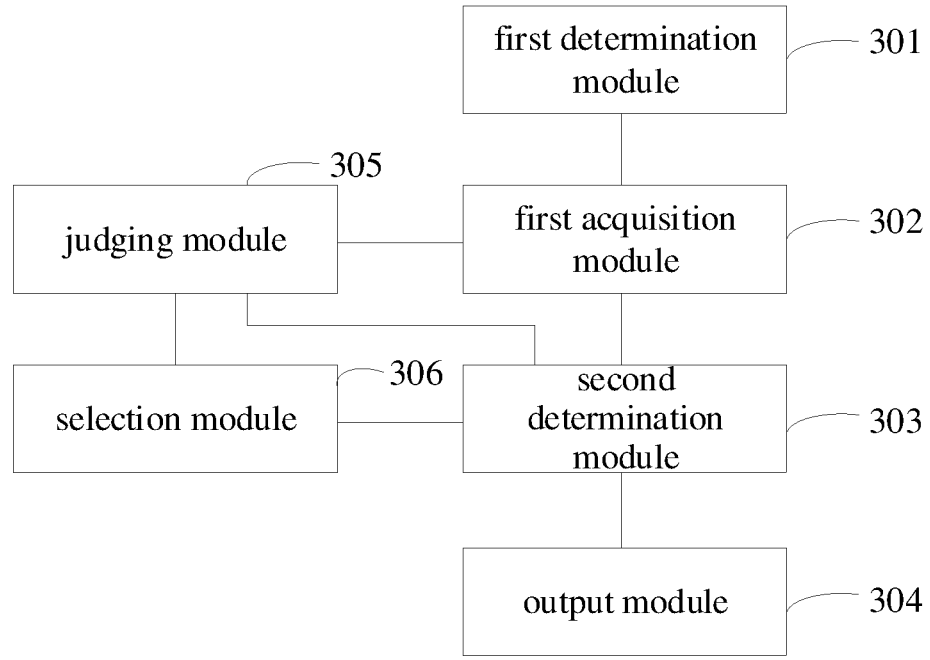
FIG. 3 is a block diagram illustrating a photographing apparatus according to embodiments of the present disclosure.

As illustrated in FIG. 3, the photographing apparatus according to embodiments of the present disclosure may include the first determination module 301, the first acquisition module 302, the second determination module 303, and the output module 304.

The first determination module 301 is configured to determine the current photographing scene based on the current preview image. The current preview image is an image currently captured by the camera. The preview image may be displayed on a display screen, so that the user may view the content currently photographed and photographing effect through the preview image. The photographing scene may include a beach scene, a food scene, a night scene, a flower scene, an animal scene, and so on.

In some embodiments, the first determination module 301 may be configured to acquire a picture corresponding to the current preview image; and recognize the picture with the convolutional neural network picture recognition model to determine the current photographing scene.

The first acquisition module 302 may be configured to acquire, based on the current photographing scene, the pre-stored historical adjustment information of the photographing parameter matching the current photographing scene. The photographing parameter may be the brightness, the contrast, the exposure, the white balance, and the like. The adjustment information of the photographing parameter may refer to the value of the photographing parameter. For example, the photographing parameter is the brightness, the adjustment information of brightness may be the value of the brightness.

In some embodiments, the historical adjustment information of the photographing parameter in different photographing scenes may be stored in advance. For example, the adjustment information of each photographing parameter set by the user in different photographing scenes before the current time point, for example a period of time before the current time point, may be stored, such that the historical adjustment information of each photographing parameter in various photographing scene is stored in advance.

The second determination module 303 may be configured to determine the current adjustment information of the photographing parameter based on the historical adjustment information. In embodiments of the present disclosure, various methods may be adopted to determine the current adjustment information of the photographing parameter. For example, for each photographing parameter, an average value of the historical adjustment information of the photographing parameter may be obtained as the current adjustment information. As another example, one of the historical adjustment information may be selected as the current adjustment information. As still another example, the current adjustment information may be obtained through a calculation by setting weights for the historical adjustment information. The method for determining the current adjustment information may be determined according to actual needs.

In some embodiments, the second determination module 303 may be configured to, in case that two or more pieces of historical adjustment information of the photographing parameter exist, set the weight for each piece of historical adjustment information based on the preset rule, and to perform the calculation on all pieces of historical adjustment information of the photographing parameter based on the weight for each piece of historical adjustment information to obtain the current adjustment information of the photographing parameter.

In case that there is a large amount of pieces of historical adjustment information of the photographing parameter, in order to reduce calculation time and improve efficiency, some of the pieces of historical adjustment information may be selected for the calculation to obtain the current adjustment information. Furthermore, the photographing apparatus according to embodiments of the present disclosure may also include a judging module 305 and a selection module 306. The judging module 305 may be configured to, before the weight is determined by the second determination module 303 for each piece of historical adjustment information, judge whether the number of the pieces of historical adjustment information is greater than or equal to the predetermined number.

When the number of the pieces of historical adjustment information is less than the predetermined number, no selection operation is performed by the selection module 306. The second determination module 303 is configured to set the weights for all pieces of historical adjustment information, and to perform the calculation on all pieces of historical adjustment information based on the weights to obtain the current adjustment information of the photographing parameter.

The selection module 306 may be configured to, when the number of the pieces of historical adjustment information is greater than or equal to the predetermined number, select the predetermined number of pieces of historical adjustment information. The predetermined number of pieces of historical adjustment information may be selected based on a sequence of storing time of the historical adjustment information. In detail, starting from the historical adjustment information having a storing time closest to the current time point, the predetermined number of pieces of historical adjustment information may be sequentially selected in an order of storing time from closest to farthest to the current time point. The predetermined number may be set according to actual needs, for example, 5, 8, or 15 and so on.

After selecting the predetermined number of pieces of historical adjustment information, the second determination module 303 may be configured to: set the weight for each selected piece of historical adjustment information based on the preset rule, and perform the calculation on the predetermined number of pieces of historical adjustment information selected, based on the weight for each selected piece of historical adjustment information, to obtain the current adjustment information of the photographing parameter. The preset rule may be, for example, setting the weights according to the sequence of the storing time of the historical adjustment information. The closer the storing time to the current time point, the greater the weight of the historical adjustment information, or the closer the storing time to the current time point, the smaller the weight of the historical adjustment information. In other embodiments, the weight of the historical adjustment information corresponding to the storing time ranked at the middle may be set as a maximum value, while weights of the historical adjustment information corresponding to the storing time ranked at the top and at the bottom may be set as smaller values. The rule may be determined based on actual needs, and is not limited here. The sum of all weights is 1.

In embodiments, the second determination module 303 may be configured to perform the calculation on the predetermined number of pieces of historical adjustment information selected based on a following formula: $P=\lambda 1*P1+\lambda 2*P2+ \ldots +\lambda n*Pn$, where, $\lambda 1+\lambda 2+ \ldots +\lambda n=1$, n is the predetermined number, P is the current adjustment information, $P1, P2, \ldots, Pn$ represent n selected pieces of historical adjustment information respectively, $\lambda 1, \lambda 2, \ldots, \lambda n$ represent the weights for the n pieces of historical adjustment information, respectively. Consequently, the current adjustment information of the photographing parameter may be calculated.

The output module 304 may be configured to adjust the current preview image based on the current adjustment information of the photographing parameter to output the adjusted current preview image. After the current adjustment information of the photographing parameter is acquired, the current adjustment information is used to adjust the current preview image to output the adjusted current preview image, so that the user may perform the photographing based on the current preview image.

With the embodiments, the photographing parameter may be automatically adjusted depending on various photographing scenes without manual adjustment of the user, thereby providing convenience for the user. In addition, by determining the current adjustment information of the photographing parameter using the historical adjustment information of the photographing parameter in different scenes generated by the users, the photographing parameter is adjusted in combination with photographing habits of the users, such that effect of the preview image may be consistent with preferences of the user, and frequency of manually adjusting the photographing parameter by the user may be reduced, thereby allowing the photographing smart.

In some embodiments, the second determination module 303 may be configured to, when there is only one piece of historical adjustment information of the photographing parameter (for example, as illustrated in Table 1, there is only one piece of historical brightness value of the brightness), determine the historical brightness value as the current brightness value. Certainly, in other embodiments, when there is only one piece of historical adjustment information of the photographing parameter, the default adjustment information of the camera may also be used as the adjustment information of the photographing parameter.

In some embodiments, after the adjusted current preview image is output, if the user takes a picture based on the adjusted current preview image (that is, a photographing instruction of the user is detected), the current photographing scene and the current adjustment information of the photographing parameter when photographing the current preview image may be stored, and the storing time may be recorded. Therefore, a correspondence between the photographing scene and the current adjustment information of the photographing parameter is established. The correspondence may be used to provide the historical adjustment information to adjust the photographing parameter when the user takes a picture next time.

Figure 4:
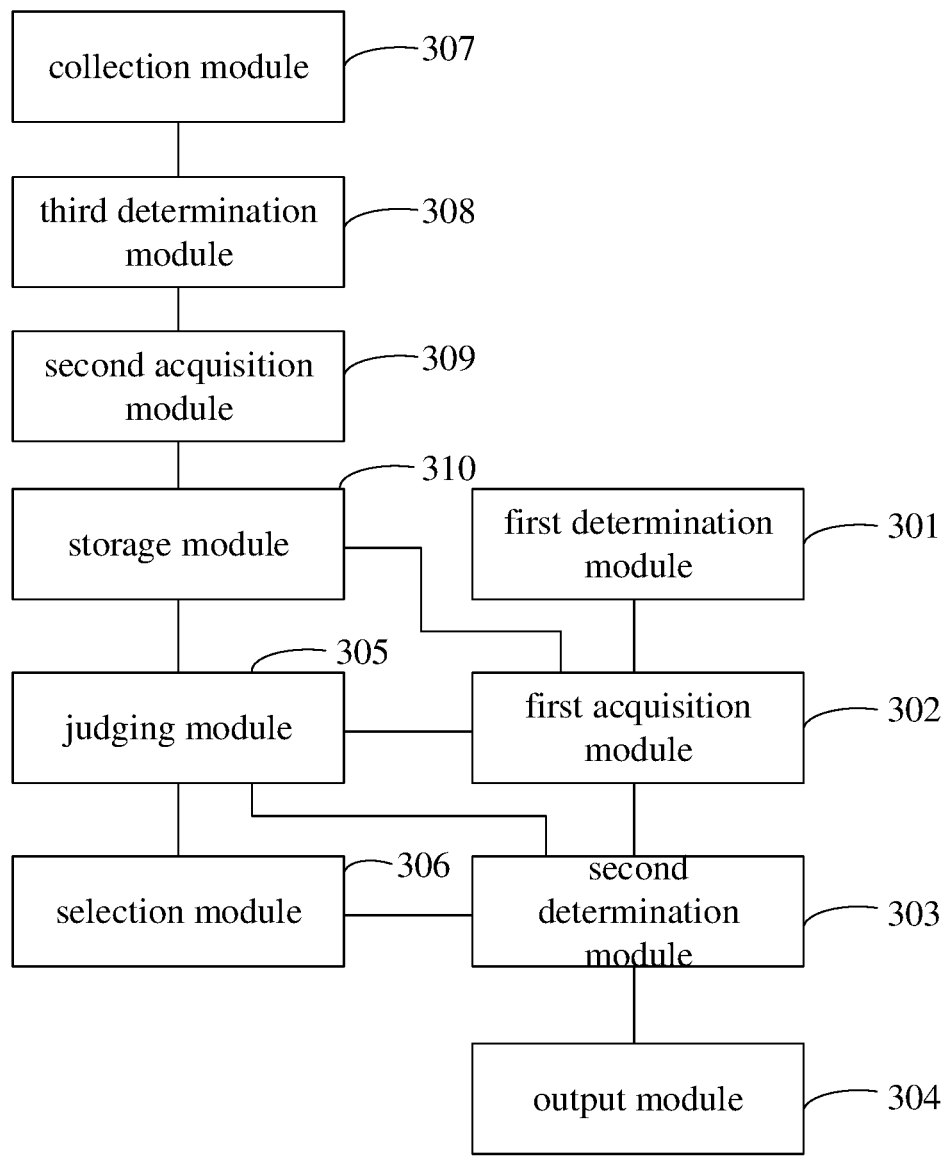
FIG. 4 is another block diagram illustrating a photographing apparatus according to embodiments of the present disclosure.

As illustrated in FIG. 4, the photographing apparatus provided by another embodiment of the present disclosure may further include a collection module 307, a third determination module 308, a second acquisition module 309 and a storage module 310.

In embodiments, before the pre-stored historical adjustment information of the photographing parameter matching the current photographing scene is acquired by the first acquisition module 302, the collection module 307 may be configured to collect multiple historical preview images. For example, a preview image captured by the camera is acquired each time the camera is turned on by the user to take a picture within a period of time before the current time point, for example, within a month or a week.

The third determination module 308 may be configured to recognize the multiple historical preview images with the convolutional neural network picture recognition model to determine multiple historical photographing scenes. A picture corresponding to the historical preview image is input into the trained convolutional neural network picture recognition model, to identify a photographing scene corresponding to the historical preview image.

The second acquisition module 309 may be configured to acquire the historical adjustment information of the photographing parameter for photographing each historical preview image to acquire the historical adjustment information of the photographing parameter in the historical photographing scene corresponding to the historical preview image. Each time a historical preview image is obtained, scene recognition may be performed on the historical preview image to identify the historical photographing scene corresponding to the historical preview image, and the historical adjustment information of the photographing parameter for photographing the historical preview image may be acquired. That is, the value of the photographing parameter set by the user when the historical preview image is photographed is acquired, to obtain the historical adjustment information of the photographing parameter in the photographing scene corresponding to the historical preview image.

The storage module 310 may be configured to store the multiple historical photographing scenes and the historical adjustment information of the photographing parameter in each historical photographing scene to establish a correspondence between each historical photographing scene and the historical adjustment information of the photographing parameter in each historical photographing scene.

The first acquisition module 302 may be configured to acquire the historical adjustment information of the photographing parameter matching the current photographing scene based on the correspondence. For example, after the current photographing scene is recognized, the current photographing scene is compared with the pre-stored historical photographing scene to find a historical photographing scene that is consistent with the current photographing scene. Further, the stored historical adjustment information of the photographing parameter corresponding to the historical photographing scene that is consistent with the current photographing scene may be acquired. Consequently, the historical adjustment information of the photographing parameter matching the current photographing scene may be obtained.

Embodiments of the present disclosure provide a storage medium having instructions stored thereon. The instructions may be loaded by a processor to perform any one of the photographing methods according to embodiments of the present disclosure.

For example, in some embodiments, the instructions may be loaded by the processor to perform the following acts of: determining a current photographing scene based on a current preview image; acquiring, based on the current photographing scene, a pre-stored historical adjustment information of a photographing parameter matching the current photographing scene; determining current adjustment information of the photographing parameter based on the historical adjustment information; and adjusting the current preview image based on the current adjustment information of the photographing parameter to output an adjusted current preview image.

It would be understood by those skilled in the art that all or a part of the acts of the method in the above-described embodiments may be implemented by relevant hardware instructed by a program. The program may be stored in a computer readable storage medium. The storage medium may be a read-only memory (ROM), a random-access memory (RAM), a magnetic disk, an optical disk, or the like.

Embodiments of the present disclosure further provide an electronic device. The electronic device includes a storage device and a processor. The storage device is configured to store instructions and data. The instructions are suitable for being loaded by the processor to perform any one of photographing methods according to embodiments of the present disclosure.

In some embodiments, the instructions are suitable for being loaded by the processor to perform the following acts of: determining a current photographing scene based on a current preview image; acquiring, based on the current photographing scene, a pre-stored historical adjustment information of the photographing parameter matching the current photographing scene; determining current adjustment information of a photographing parameter based on the historical adjustment information; and adjusting the current preview image based on the current adjustment information of the photographing parameter to output an adjusted current preview image.

In some embodiments, for determining the current adjustment information of the photographing parameter based on the historical adjustment information, the processor is configured to: in case that two or more pieces of historical adjustment information of the photographing parameter exist, set a weight for each piece of historical adjustment information based on a preset rule; and perform a calculation on all pieces of historical adjustment information of the photographing parameter based on the weight for each piece of historical adjustment information to obtain the current adjustment information of the photographing parameter.

In some embodiments, before setting the weight for each piece of historical adjustment information based on the preset rule, the processor is further configured to: judge whether the number of the pieces of historical adjustment information is greater than or equal to a predetermined number; and in response to of judging that the number is greater than or equal to the predetermined number, select the predetermined number of pieces of historical adjustment information. Setting the weight for each piece of historical adjustment information based on the preset rule includes: setting the weight for each selected piece of historical adjustment information based on the preset rule. Performing the calculation on all pieces of historical adjustment information of the photographing parameter based on the weight for each piece of historical adjustment information includes: performing the calculation on the predetermined number of pieces of historical adjustment information selected based on the weight for each selected piece of historical adjustment information to obtain the current adjustment information of the photographing parameter.

In some embodiments, for performing the calculation on the predetermined number of pieces of historical adjustment information selected based on the weight for each selected piece of historical adjustment information, the processor is configured to perform the calculation on the predetermined number of pieces of historical adjustment information selected based on a following formula: $P=\lambda1*P1+\lambda2*P2+ \ldots +\lambda n*Pn$, where $\lambda1+\lambda2+ \ldots +\lambda n=1$, n is the predetermined number, P is the current adjustment information, $P1, P2, \ldots, Pn$ represent n selected pieces of historical adjustment information respectively, $\lambda1, \lambda2, \ldots, \lambda n$ represent the weights for the n pieces of historical adjustment information, respectively.

In some embodiments, for setting the weight for each selected piece of historical adjustment information selected based on the preset rule, the processor is configured to: set the weight for each selected piece of historical adjustment information based on a sequence of storing time of the historical adjustment information such that the closer is the storing time to the current time point, the greater the weight of the historical adjustment information corresponding to the storing time.

In some embodiments, for selecting the predetermined number of pieces of historical adjustment information, the processor is configured to: starting from the historical adjustment information having a storing time closest to the current time point, sequentially select the predetermined number of the pieces of historical adjustment information of the in an order of storing time from closest to farthest to the current time point.

In some embodiments, for determining the current adjustment information of the photographing parameter based on the historical adjustment information, the processor is configured to: in case that only one piece of historical adjustment information of the photographing parameter exists, determine the historical adjustment information as the current adjustment information of the photographing parameter.

In some embodiments, for determining the current photographing scene based on the current preview image, the processor is configured to: acquire a picture corresponding to the current preview image; and recognize the picture with a convolutional neural network picture recognition model to determine the current photographing scene.

In some embodiments, before acquiring, based on the current photographing scene, the pre-stored historical adjustment information of the photographing parameter matching the current photographing scene, the processor is further configured to: collect multiple historical preview images; recognizing the multiple historical preview images with the convolutional neural network picture recognition model to determine multiple historical photographing scenes; acquire the historical adjustment information of the photographing parameter for photographing each historical preview image to acquire the historical adjustment information of the photographing parameter in the historical photographing scene corresponding to the historical preview image; and store the multiple historical photographing scenes and the historical adjustment information of the photographing parameter in each historical photographing scene to establish a correspondence between each historical photographing scene and the historical adjustment information of the photographing parameter in each historical photographing scene.

Acquiring, based on the current photographing scene, the pre-stored historical adjustment information of the photographing parameter that matches the current photographing scene includes: acquiring, based on the correspondence, the historical adjustment information of the photographing parameter that matches the current photographing scene.

Figure 5:
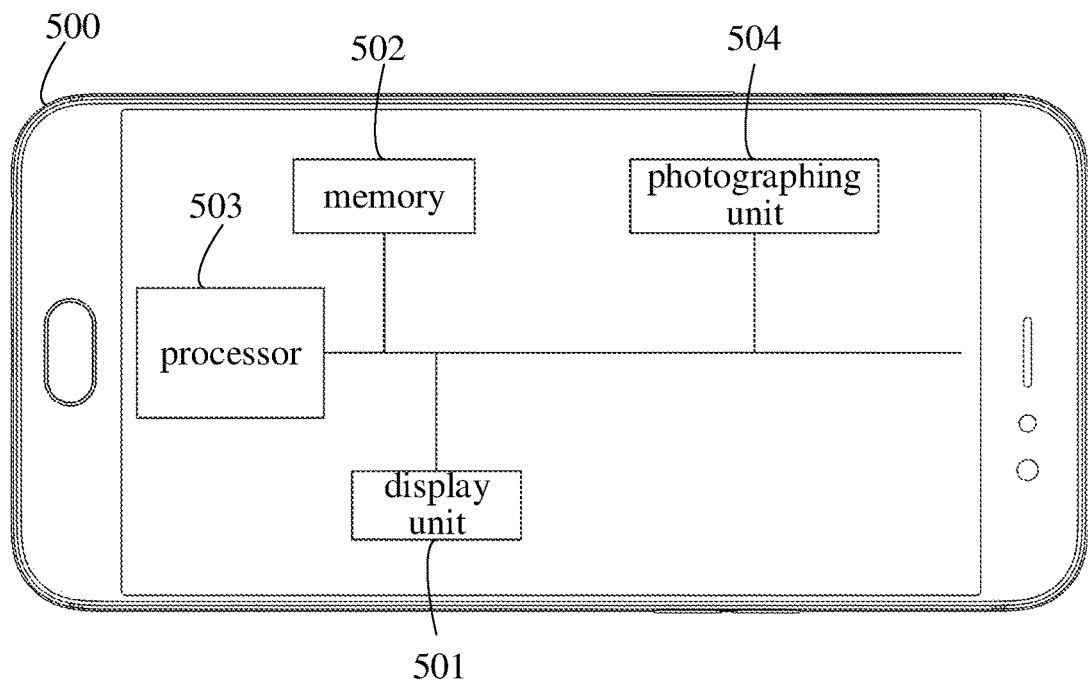
FIG. 5 is a block diagram illustrating an electronic device according to embodiments of the present disclosure.

For example, the electronic device may be, a tablet computer, a smart phone, and the like. As illustrated in FIG. 5, FIG. 5 is a block diagram illustrating an electronic device according to embodiments of the present disclosure.

The electronic device 500 may include a display unit 501, a memory 502, a processor 503, and a photographing unit 504. Those skilled in the art may understand that the structure of the electronic device illustrated in FIG. 5 does not limit the electronic device. The electronic device may include more or fewer components than those illustrated in the figure, or some components may be combined, or different components may be arranged.

The display unit 501 may be configured to display image information and the like. For example, the display unit 501 may be a display screen.

The memory 502 may be configured to store application programs and data. The application programs stored in the memory 502 may include executable codes. The application programs may form various functional modules. The processor 503 may be configured to execute various functional applications and data processing by running application programs stored in the memory 502.

The processor 503 is a control center of the electronic device, and is connected to various components of the electronic device through various interfaces and wires. Through running or executing the application programs stored in the memory 502 and calling the data stored in the memory 502, the processor 503 may be configured to execute various functions of the electronic device and process data to monitor the overall electronic device.

The photographing unit 504 may be configured to take pictures, and may be, for example, a camera.

In embodiments, the electronic device may further include one or more programs. The one or more programs may be stored in the memory 502, and are configured such that one or more processors 503 execute instructions included in the one or more programs to perform the following acts of: determining a current photographing scene based on a current preview image; acquiring a pre-stored historical adjustment information of a photographing parameter matching the current photographing scene based on the current photographing scene, determining current adjustment information of the photographing parameter based on the historical adjustment information, and adjusting the current preview image based on the current adjustment information of the photographing parameter to output an adjusted current preview image.

In case that two or more pieces of historical adjustment information of the photographing parameter exist, a weight is set for each piece of historical adjustment information based on the preset rule. A calculation is performed on all pieces of historical adjustment information of the photographing parameter based on the weight for each piece of historical adjustment information to obtain the current adjustment information of the photographing parameter.

Before setting the weight for each piece of historical adjustment information based on the preset rule, it may be judged whether the number of the pieces of historical adjustment information is greater than or equal to a predetermined number. In response to judging that the number is greater than or equal to the predetermined number, the predetermined number of pieces of historical adjustment information is selected, and the weight is set for each selected piece of historical adjustment information selected based on the preset rule. The calculation is performed on the predetermined number of pieces of historical adjustment information selected based on the weight for each selected piece of historical adjustment information to obtain the current adjustment information of the photographing parameter.

The calculation is performed on the predetermined number of pieces of historical adjustment information selected based on a following formula: $P=\lambda_1 * P_1 + \lambda_2 * P_2 + \ldots + \lambda_n * P_n$, where, $\lambda_1 + \lambda_2 + \ldots + \lambda_n = 1$, n is the predetermined number, P is the current adjustment information, $P_1, P_2, \ldots, P_n$ represent n selected pieces of historical adjustment information respectively, $\lambda_1, \lambda_2, \ldots, \lambda_n$ represent the weights of the n pieces of historical adjustment information, respectively.

The weight is set for each piece of historical adjustment information selected based on a sequence of storing time of the historical adjustment information, such that the closer the storing time to the current time point, the greater the weight of the historical adjustment information corresponding to the storing time.

For implementations of the foregoing operations, reference may be made to the foregoing embodiments, and details are not described herein again.

Consequently, the electronic device according to embodiments of the present disclosure may automatically adjust the photographing parameter depending on different photographing scenes without manual adjustment by the user, thereby providing convenience for the user. In addition, through determining the current adjustment information of the photographing parameter using the historical adjustment information of the photographing parameter generated by the user in different scenes, the photographing parameter may be adjusted in combination with photographing habits of the user, such that effect of the preview image may be consistent with preferences of the user, and the frequency of manually adjusting the photographing parameter by the user may be reduced, thereby allowing the photographing smart.

Figure 6:
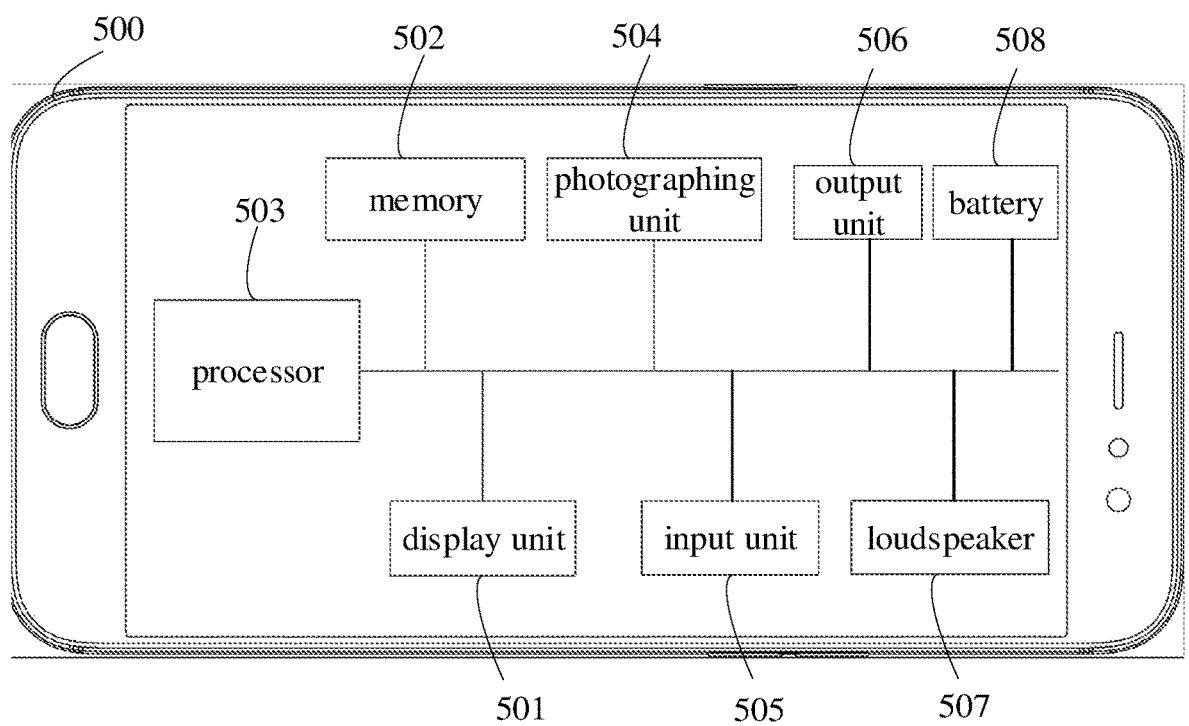
FIG. 6 is another block diagram illustrating an electronic device according to embodiments of the present disclosure.

Further, as illustrated in FIG. 6, the electronic device according to embodiments of the present disclosure may include an input unit 505, an output unit 506, a loudspeaker 507 and a battery 508.

The input unit 505 may be configured to receive inputted numbers, character information, or characteristic information (such as fingerprints) of the user, and to generate keyboard, mouse, joystick, optical, or trackball signal inputs related to user settings and function control.

The output unit 506 may be configured to display information input by the user or provided to the user, and various graphical user interfaces of the mobile terminal. These graphical user interfaces may be composed of graphics, texts, icons, videos, and any combination thereof. The output unit may include a display panel.

It should be noted that, for the photographing method according to embodiments of the present disclosure, those skilled in the art may understand that all or part of the processes of implementing the photographing method according to embodiments of the present disclosure may be executed by controlling related hardware through a computer program. The computer program may be stored in a computer-readable storage medium, such as stored in a storage device, and executed by at least one processor. During execution, the computer program may include a process of the method for adjusting a picture as described above. The storage medium may be a magnetic disk, an optical disk, a read only memory (ROM), a random-access memory (RAM), and the like.

Individual functional modules of the photographing apparatus according to embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer-readable storage medium such as a read-only memory, a magnetic disk, or an optical disk.

The photographing method and apparatus, the storage medium, and the electronic device according to embodiments of the present disclosure are described in detail above. Specific embodiments are used in the present disclosure to explain the principle and implementations of the present disclosure. The description of the above embodiments is only to facilitate understanding of the method and core ideas of the present disclosure. In addition, for those skilled in the art, based on the idea of the present disclosure, changes may be made in terms of the specific implementations and application scope. In summary, the content of the present disclosure should not be construed as limiting the present disclosure.

What is claimed is:

1. A method for photographing, comprising:
    determining a current photographing scene based on a current preview image;
    acquiring, based on the current photographing scene, pre-stored historical adjustment information of a photographing parameter matching the current photographing scene;

determining current adjustment information of the photographing parameter based on the historical adjustment information; and adjusting the current preview image based on the current adjustment information of the photographing parameter to obtain an adjusted current preview image, and outputting the adjusted current preview image;

wherein the method further comprises:

collecting a plurality of historical preview images;

recognizing the plurality of historical preview images with a convolutional neural network picture recognition model to determine a plurality of historical photographing scenes;

acquiring historical adjustment information of the photographing parameter for photographing each historical preview image to acquire the historical adjustment information of the photographing parameter in a historical photographing scene corresponding to the historical preview image; and storing the plurality of historical photographing scenes and the historical adjustment information of the photographing parameter in each historical photographing scene to establish a correspondence between each historical photographing scene and the historical adjustment information of the photographing parameter in each historical photographing scene;

wherein acquiring, based on the current photographing scene, the pre-stored historical adjustment information of the photographing parameter matching the current photographing scene comprises acquiring, based on the correspondence, the historical adjustment information of the photographing parameter matching the current photographing scene.

2. The method of claim 1, wherein determining the current adjustment information of the photographing parameter based on the historical adjustment information comprises:

in case that two or more pieces of historical adjustment information of the photographing parameter exist, setting a weight for each piece of historical adjustment information based on a preset rule; and performing a calculation on all pieces of historical adjustment information of the photographing parameter based on the weight for each piece of historical adjustment information to obtain the current adjustment information of the photographing parameter.

3. The method of claim 2, further comprising:

judging whether a number of pieces of historical adjustment information is greater than or equal to a predetermined number; and in response to judging that the number of the pieces of historical adjustment information is greater than or equal to the predetermined number, selecting the predetermined number of pieces of historical adjustment information;

wherein setting the weight for each piece of historical adjustment information based on the preset rule comprises: setting the weight for each selected piece of historical adjustment information based on the preset rule; and wherein performing the calculation on all pieces of historical adjustment information of the photographing parameter based on the weight for each piece of historical adjustment information comprises: performing the calculation on the predetermined number of pieces of historical adjustment information selected based on the weight for each selected piece of historical adjustment information to obtain the current adjustment information of the photographing parameter.

4. The method of claim 3, wherein performing the calculation on the predetermined number of pieces of historical adjustment information selected based on the weight for each selected piece of historical adjustment information comprises:

performing the calculation on the predetermined number of pieces of historical adjustment information selected based on a following formula:

$$P=\lambda 1*P1+\lambda 2*P2+\ldots +\lambda n*Pn$$

where, $\lambda 1+\lambda 2+\ldots +\lambda n=1$, n is the predetermined number, P is the current adjustment information, P1, P2, ..., Pn represent n selected pieces of historical adjustment information, $\lambda 1, \lambda 2, \ldots, \lambda n$ represent the weights for the n pieces of historical adjustment information, respectively.

5. The method of claim 3, wherein setting the weight for each selected piece of historical adjustment information based on the preset rule comprises:

setting the weight for each selected piece of historical adjustment information based on a sequence of storing time of the historical adjustment information such that the closer the storing time to a current time point, the greater the weight of the piece of historical adjustment information associated with the storing time.

6. The method of claim 3, wherein selecting the predetermined number of pieces of historical adjustment information comprises:

sequentially selecting the predetermined number of pieces of historical adjustment information in an order of storing time of the historical adjustment information.

7. The method of claim 2, wherein determining the current adjustment information of the photographing parameter based on the historical adjustment information comprises:

in case that one piece of historical adjustment information of the photographing parameter exists, determining the historical adjustment information as the current adjustment information of the photographing parameter.

8. The method of claim 1, wherein determining the current photographing scene based on the current preview image comprises:

acquiring a picture corresponding to the current preview image; and recognizing the picture with a convolutional neural network picture recognition model to determine the current photographing scene.

9. A non-transitory computer readable storage medium, having instructions stored thereon, wherein the instructions are suitable for being loaded by a processor to:

determine a current photographing scene based on a current preview image;

acquire, based on the current photographing scene, pre-stored historical adjustment information of a photographing parameter matching the current photographing scene;

determine current adjustment information of the photographing parameter based on the historical adjustment information; and adjust the current preview image based on the current adjustment information of the photographing parameter to obtain an adjusted current preview image, and output the adjusted current preview image;

wherein the method further comprises:

collecting a plurality of historical preview images;

recognizing the plurality of historical preview images with a convolutional neural network picture recognition model to determine a plurality of historical photographing scenes;

acquiring historical adjustment information of the photographing parameter for photographing each historical preview image to acquire the historical adjustment information of the photographing parameter in a historical photographing scene corresponding to the historical preview image; and storing the plurality of historical photographing scenes and the historical adjustment information of the photographing parameter in each historical photographing scene to establish a correspondence between each historical photographing scene and the historical adjustment information of the photographing parameter in each historical photographing scene;

wherein acquiring, based on the current photographing scene, the pre-stored historical adjustment information of the photographing parameter matching the current photographing scene comprises acquiring, based on the correspondence, the historical adjustment information of the photographing parameter matching the current photographing scene.

10. An electronic device, comprising a memory and a processor, wherein the memory is configured to store instructions and data, and the instructions are suitable for being loaded by the processor to:

determine a current photographing scene based on a current preview image;

acquire, based on the current photographing scene, pre-stored historical adjustment information of a photographing parameter matching the current photographing scene;

determine current adjustment information of the photographing parameter based on the historical adjustment information; and adjust the current preview image based on the current adjustment information of the photographing parameter to obtain an adjusted current preview image, and output the adjusted current preview image;

wherein the processor is further configured to:

collect a plurality of historical preview images;

recognize the plurality of historical preview images with a convolutional neural network picture recognition model to determine a plurality of historical photographing scenes;

acquire historical adjustment information of the photographing parameter for photographing each historical preview image to acquire the historical adjustment information of the photographing parameter in a historical photographing scene corresponding to the historical preview image; and store the plurality of historical photographing scenes and the historical adjustment information of the photographing parameter in each historical photographing scene to establish a correspondence between each historical photographing scene and the historical adjustment information of the photographing parameter in each historical photographing scene;

wherein acquiring, based on the current photographing scene, the pre-stored historical adjustment information of the photographing parameter matching the current photographing scene comprises acquiring, based on the correspondence, the historical adjustment information of the photographing parameter matching the current photographing scene.

11. The electronic device of claim 10, wherein for determining the current adjustment information of the photographing parameter based on the historical adjustment information, the processor is configured to:

in case that two or more pieces of historical adjustment information of the photographing parameter exist, set a weight for each piece of historical adjustment information based on a preset rule; and perform a calculation on all pieces of historical adjustment information of the photographing parameter based on the weight for each piece of historical adjustment information to obtain the current adjustment information of the photographing parameter.

12. The electronic device of claim 11, wherein the processor is further configured to:

judge whether a number of pieces of historical adjustment information is greater than or equal to a predetermined number; and in response to judging that the number of the pieces of historical adjustment information is greater than or equal to the predetermined number, select the predetermined number of pieces of historical adjustment information;

setting the weight for each piece of historical adjustment information based on the preset rule comprises: setting the weight for each selected piece of historical adjustment information based on the preset rule; and performing the calculation on all pieces of historical adjustment information of the photographing parameter based on the weight for each piece of historical adjustment information comprises: performing the calculation on the predetermined number of pieces of historical adjustment information selected based on the weight for each selected piece of historical adjustment information to obtain the current adjustment information of the photographing parameter.

13. The electronic device of claim 12, wherein for performing the calculation on the predetermined number of pieces of historical adjustment information selected based on the weight for each selected piece of historical adjustment information, the processor is configured to perform the calculation on the predetermined number of pieces of historical adjustment information selected based on a following formula:

$$P=\lambda 1*P1+\lambda 2*P2+\ldots +\lambda n*Pn$$

where, $\lambda 1+\lambda 2+\ldots +\lambda n=1$, n is the predetermined number, P is the current adjustment information, P1, P2, ..., Pn represent n selected pieces of historical adjustment information, $\lambda 1, \lambda 2, \ldots, \lambda n$ represent the weights for the n pieces of historical adjustment information, respectively.

14. The electronic device of claim 12, wherein for setting the weight for each selected piece of historical adjustment information based on the preset rule, the processor is configured to:

set the weight for each selected piece of historical adjustment information based on a sequence of storing time of the historical adjustment information such that the closer the storing time to a current time point, the greater the weight of the piece of historical adjustment information associated with the storing time.

15. The electronic device of claim 12, wherein for selecting the predetermined number of pieces of historical adjustment information, the processor is configured to:

sequentially select the predetermined number of pieces of historical adjustment information in an order of storing time of the historical adjustment information.

16. The electronic device of claim 11, wherein for determining the current adjustment information of the photographing parameter based on the historical adjustment information, the processor is configured to:

in case that one piece of historical adjustment information of the photographing parameter exists, determine the historical adjustment information as the current adjustment information of the photographing parameter.

17. The electronic device of claim 10, wherein for determining the current photographing scene based on the current preview image, the processor is configured to:

acquire a picture corresponding to the current preview image; and recognize the picture with a convolutional neural network picture recognition model to determine the current photographing scene.

18. The non-transitory computer readable storage medium of claim 9, wherein the instructions are suitable for being loaded by a processor to:

in case that two or more pieces of historical adjustment information of the photographing parameter exist, set a weight for each piece of historical adjustment information based on a preset rule; and perform a calculation on all pieces of historical adjustment information of the photographing parameter based on the weight for each piece of historical adjustment information to obtain the current adjustment information of the photographing parameter; and in case that one piece of historical adjustment information of the photographing parameter exists, determine the historical adjustment information as the current adjustment information of the photographing parameter.

* * * * *